(12) United States Patent
Bogue

(10) Patent No.: US 7,650,678 B2
(45) Date of Patent: Jan. 26, 2010

(54) FABRIC BUSHING INSTALLATION TO REPAIR A HOLE

(75) Inventor: William F. Bogue, Hebron, CT (US)

(73) Assignee: United Technologies Corporation, Hartford, CT (US)

( * ) Notice: Subject to any disclaimer, the term of this patent is extended or adjusted under 35 U.S.C. 154(b) by 86 days.

(21) Appl. No.: 11/394,939

(22) Filed: Mar. 30, 2006

(65) Prior Publication Data

US 2007/0234544 A1 Oct. 11, 2007

(51) Int. Cl.
*B23P 19/04* (2006.01)
(52) U.S. Cl. .............. 29/402.09; 29/402.01; 29/402.02; 29/451
(58) Field of Classification Search .............. 29/402.01, 29/402.02, 402.09, 402.18, 402.19, 402.12, 29/402.15, 451
See application file for complete search history.

(56) References Cited

U.S. PATENT DOCUMENTS

| | | | |
|---|---|---|---|
| 3,639,978 A * | 2/1972 | Schurman | 29/837 |
| 4,589,447 A * | 5/1986 | Kane et al. | 138/98 |
| 4,953,777 A | 9/1990 | Griffith et al. | |
| 4,961,799 A * | 10/1990 | Cologna et al. | 156/92 |
| 5,111,570 A | 5/1992 | Baumgarten et al. | |
| 6,370,752 B1 | 4/2002 | Anderson et al. | |
| 6,656,299 B1 * | 12/2003 | Grosskrueger et al. | 156/98 |
| 7,419,556 B2 * | 9/2008 | Holland | 156/98 |
| 2004/0238596 A1 * | 12/2004 | Ellison et al. | 228/56.3 |

* cited by examiner

*Primary Examiner*—David P Bryant
*Assistant Examiner*—Bayan Salone
(74) *Attorney, Agent, or Firm*—Kinney & Lange, P.A.

(57) ABSTRACT

A method and system for repairing a damaged hole includes a deformable rod and a fabric wrapped around a middle portion of the rod. A first portion of the rod is inserted into the damaged hole. The rod is stretched to align the middle portion of the rod and the fabric with an inside circumference of the hole. The rod is then relaxed to compress the fabric against the inside circumference of the hole.

18 Claims, 7 Drawing Sheets

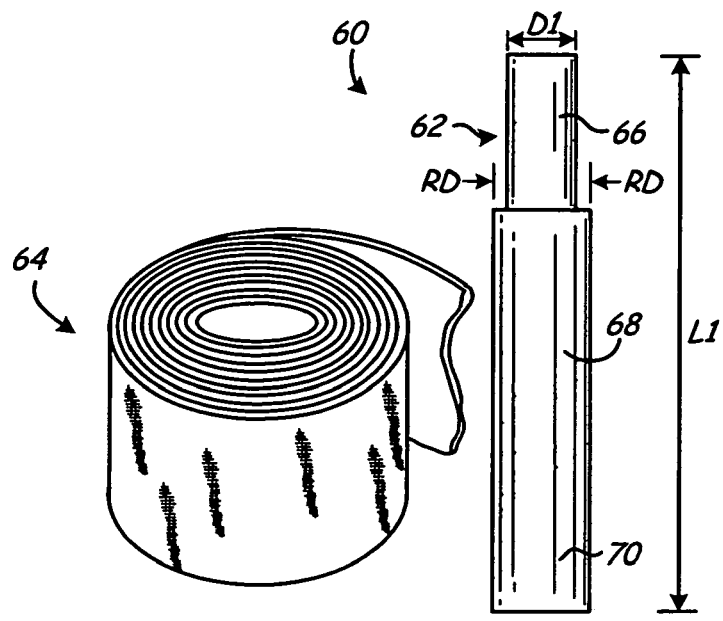
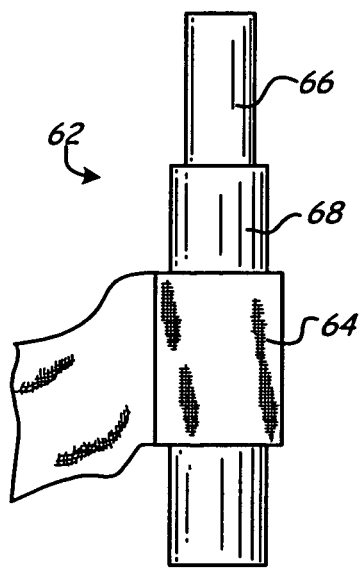
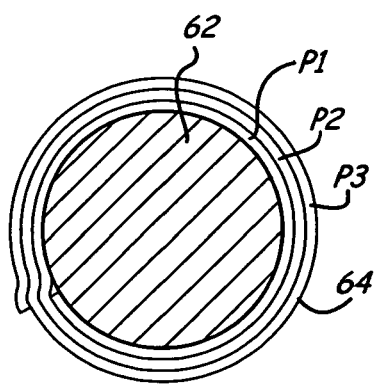
Fig. 5
Fig. 6
Fig. 7

FABRIC BUSHING INSTALLATION TO REPAIR A HOLE

BACKGROUND OF THE INVENTION

The present invention relates generally to a method and system for repairing a damaged hole. More particularly, the invention relates to a method and system for repairing an enlarged bolt hole on a composite nose cone of a gas turbine engine.

A removable nose cone is regularly attached to a hub in the center of the inlet of a gas turbine engine. The nose cone provides a smooth aerodynamic surface covering for the hub hardware and feeds air into the fan blades. In some engine designs the nose cone rotates with the fan blades.

The nose cone may be attached to the hub with a plurality of attachment bolts that pass through attachment holes on a flange of the nose cone that are aligned with corresponding holes on the hub. The flange includes alternating attachment holes and balance weight holes. The balance weight holes are used to balance the nose cone before installation of the nose cone to the hub by inserting bolts through the balance weight holes. The bolts for the attachment holes are inserted once the nose cone is aligned with the hub.

Due to the operating conditions inside a gas turbine engine, over time the attachment holes and the balance weight holes on the flange become enlarged. An enlarged hole allows the bolt to move around within the hole. Therefore, it may become necessary to restore the bolt holes so that the bolts are properly secured within the attachment holes and the balance weight holes.

One approach to repairing an enlarged hole includes filling the hole with chopped fiber-filled epoxy resin and then drilling out an area where the bolt is to be reinserted. However, this approach is inadequate in terms of its durability. Alternatively, replacing the entire nose cone is extremely expensive.

Therefore, there is a need for a cost-effective, yet durable, method of repairing an enlarged hole on various components.

BRIEF SUMMARY OF THE INVENTION

The present invention is a method and system for repairing a damaged hole, including inserting a first portion of a deformable rod into the hole. The rod has a woven fabric wrapped around a middle portion of the rod. The method further includes stretching the rod to align the middle portion of the rod and the fabric with an inside circumference of the hole, and then relaxing the rod to compress the fabric against the inside circumference of the hole.

BRIEF DESCRIPTION OF THE DRAWINGS

FIGS. 5-7 show a system used for repairing an enlarged bolt hole.

DETAILED DESCRIPTION

Figure 1:
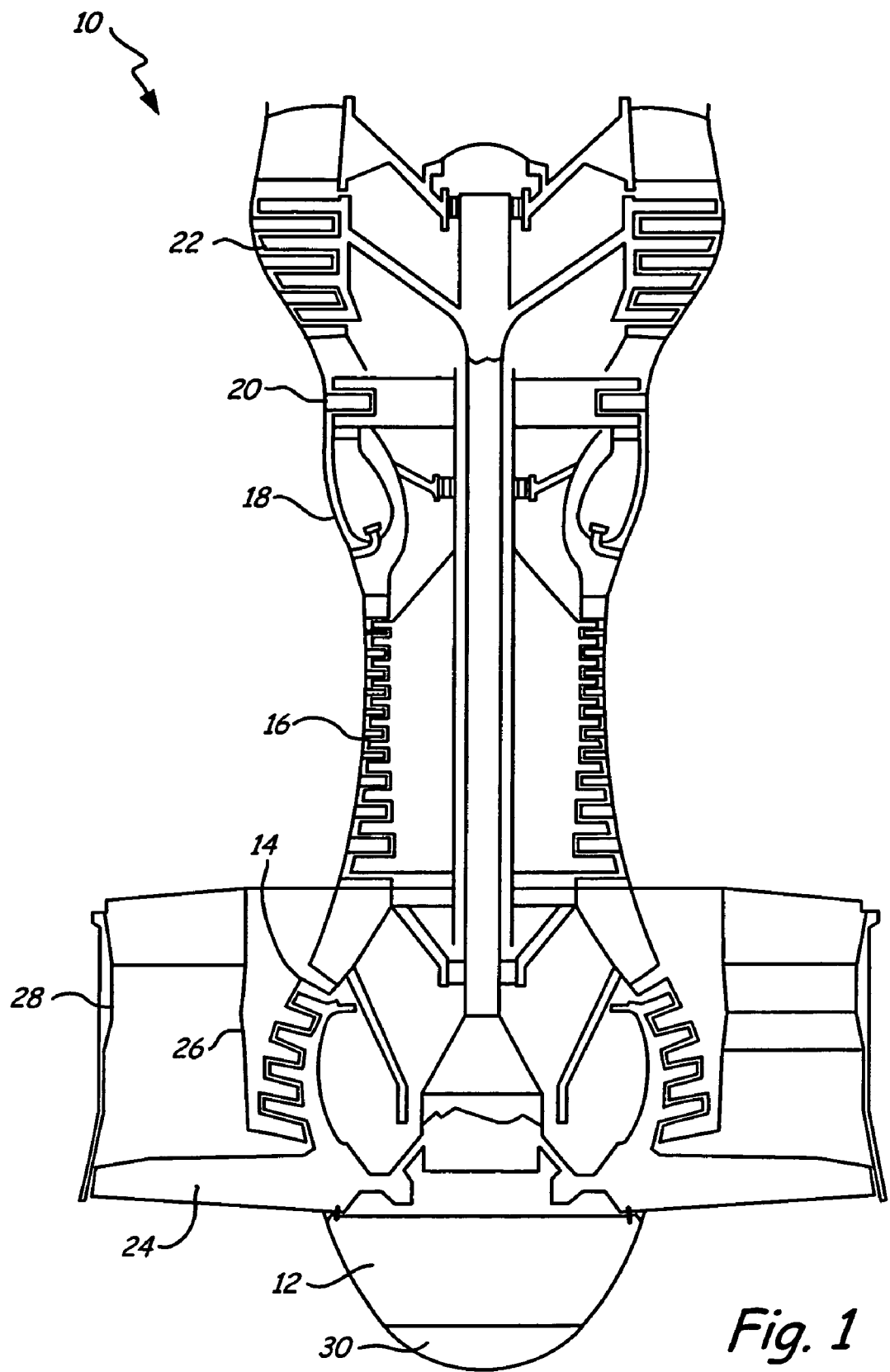
FIG. 1 is a cross-sectional view of a turbofan engine.

FIG. 1 is a cross-sectional view of turbofan gas turbine engine 10, which includes inlet nose cone 12, low pressure compressor 14, high pressure compressor 16, combustor 18, high pressure turbine 20, and low pressure turbine 22.

Low pressure compressor 14 includes fan section 24, inner fan case 26, and outer fan case 28. Inlet nose cone 12 includes access cap 30. Nose cone 12 is attached to fan section 24 at an opposing end.

Figure 2:
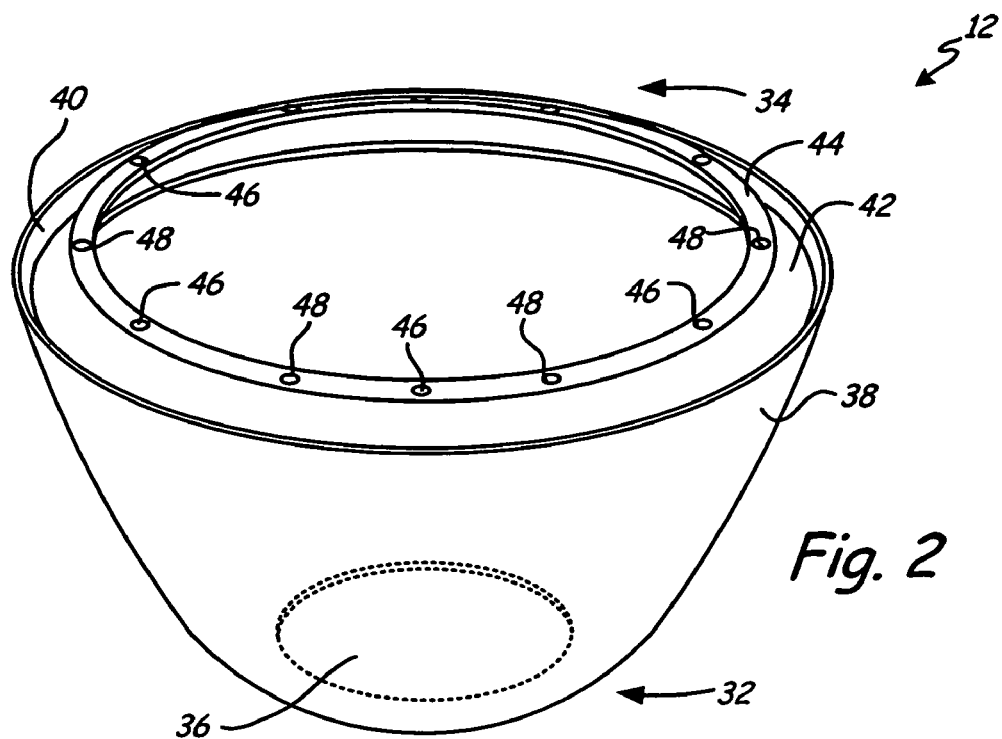
FIG. 2 is a perspective view of an inlet nose cone of the turbofan engine of FIG. 1.

FIG. 2 is a perspective side view of inlet nose cone 12 having forward (front) end 32 and aft (rear) end 34. Inlet nose cone 12 includes opening 36, body portion 38, aft fairing 40, ramp 42 and flange 44. Opening 36 is located at forward end 32 of nose cone 12 and is configured to receive access cap 30. Aft fairing 40 extends from body portion 38 at aft end 34 of nose cone 12. Ramp 42 also extends from body portion 38 at aft end 34 of nose cone 12. Body portion 38, aft fairing 40 and ramp 42 are configured such that they form a Y-joint at their junction. Flange 44 extends from ramp 42. Flange 44 includes a plurality of balance weight holes 46 and a plurality of attachment holes 48 in an alternating sequence around flange 44.

Balance weight holes 46 are designed for balancing nose cone 12 before it is attached to fan section 24. Balance weight holes 46 are configured to receive balance weight bolts, counterweight washers and nuts (not shown).

Attachment holes 48 are configured to align with corresponding holes (not shown) on fan section 24. Attachment bolts (not shown) can be inserted through attachment holes 48 and the holes on fan section 24 to secure nose cone 12 to fan section 24.

Figure 3:
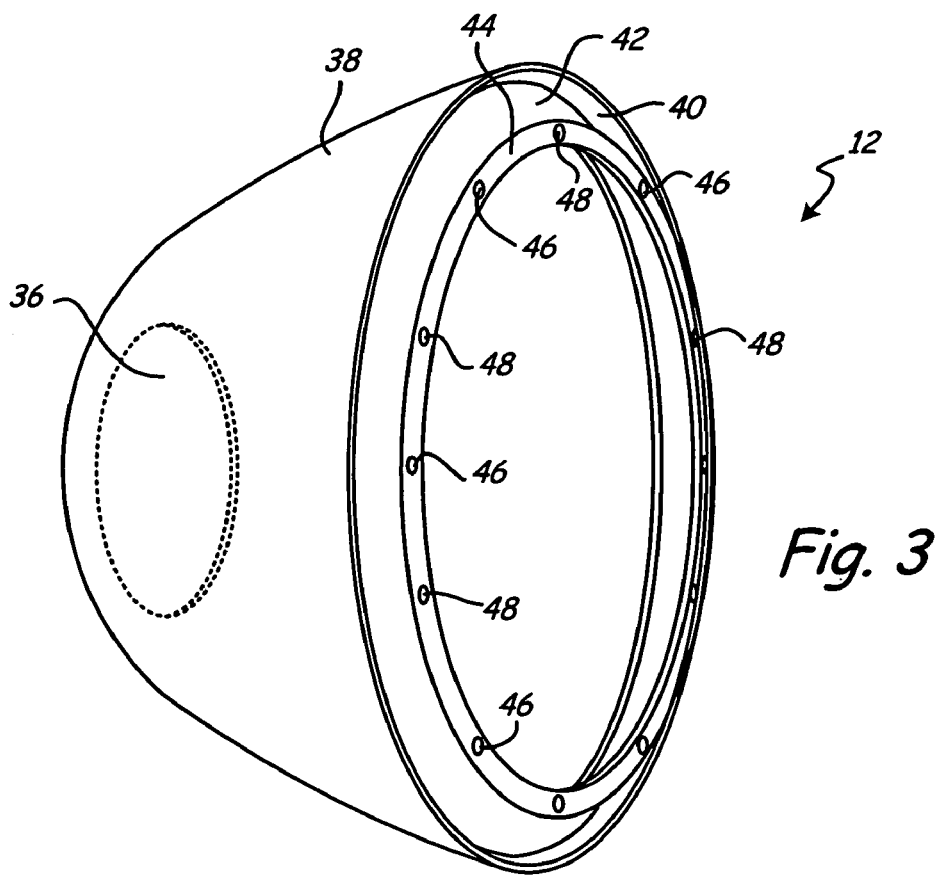
FIG. 3 is a perspective view of the inlet nose cone of FIG. 2 rotated 90 degrees clock-wise.

FIG. 3 is another perspective view of inlet nose cone 12 of FIG. 2.

Figure 4:
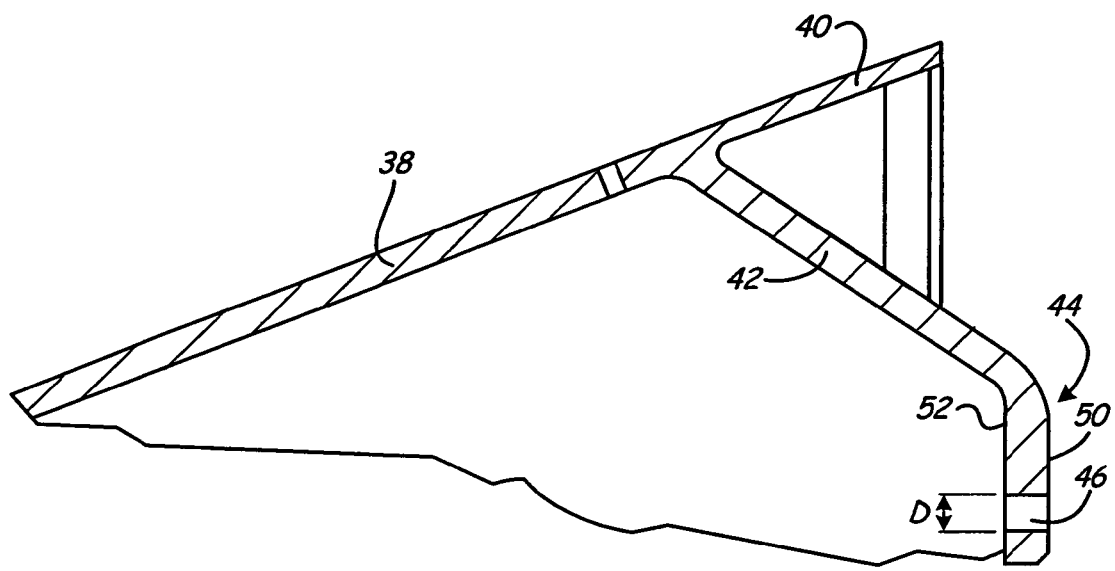
FIG. 4 is a cross-sectional view of a portion of the nose cone of FIG. 3, including an enlarged bolt hole needing repair.

FIG. 4 is a cross-sectional view of a portion of inlet nose cone 12 of FIG. 3. As shown in FIG. 4, nose cone 12 includes body portion 38, aft fairing 40, ramp 42 and flange 44 including a balance weight hole 46. Flange 44 also includes outer surface 50 and inner surface 52.

Over time, the operating conditions inside gas turbine engine 10 cause diameter D of balance weight hole 46 to increase. This causes a bolt (not shown) that is secured through hole 46 to move around, which is undesirable. As such, it may become necessary to repair enlarged balance weight hole 46.

Although not shown in FIG. 4, attachment holes 48 on flange 44 may also increase in diameter over time. As such, attachment holes 48 may similarly need to be repaired to reduce the size of the enlarged holes.

In one embodiment, attachment holes 48 may be larger in diameter compared to balance weight holes 46. For example, attachment holes 48 may be designed to be less than 0.30 inches, and balance weight holes 46 may be designed to be less than 0.25 inches. However, it is recognized that the repair of any size bolt hole is within the scope of the present invention.

An enlarged balance weight hole or attachment hole could be repaired by filling an entire area of the hole with a composite material. Fiberglass is a preferred material used in the aircraft industry because it is strong, durable, and tolerates extremely high temperatures. As an example, chopped strands of fiberglass combined with a resin, like epoxy, could be inserted into the hole to fill up an entire area of the hole. The composite of fiberglass and epoxy may then be cured so that it hardens inside the hole. Then an area approximately equal in diameter to the diameter of the bolt may be drilled out so that the bolt can be received into the repaired hole.

One of the disadvantages to using chopped strands of fiberglass combined with a resin is that the composite is not as durable compared to a woven fabric impregnated with resin. Proper repair of the enlarged hole requires a sufficiently durable and strong material. Moreover, another disadvantage of the above process is that it requires the additional step of drilling out the material in order to create an area for the bolt to be inserted into the hole.

FIGS. 5-7 illustrate an embodiment of the present invention, system 60, which is used for repairing an enlarged hole, such as, but not limited to, an enlarged bolt hole in an inlet nose cone. System 60 includes rod 62 and roll of fabric 64. As explained in more detail below, fabric 64 is designed to be installed into an enlarged hole and function as a bushing inside the hole, thus decreasing the diameter of the hole. Rod 62 includes a relaxed state and a stretched state, as also discussed below.

FIG. 5 is a perspective view of rod 62 in the relaxed state and fabric 64 before fabric 64 is wrapped around rod 62. Rod 62 includes length L1, first end region 66, middle region 68, and second end region 70. First end region 66 has first is diameter D1. When rod 62 is in the relaxed state, middle region 68 has diameter RD. As shown in FIG. 5, rod 62 has a step diameter reduction such that first diameter D1 of first end 66 is less than diameter RD of middle region 68.

Although not shown in FIG. 5, rod 62 may be configured such that second end 70 also has a step diameter reduction and a diameter less than diameter RD of middle region 68.

As an alternative embodiment to FIG. 5, rod 62 could taper inward around first end 66 to have a tapered diameter reduction instead of a step diameter reduction. Likewise, second end 70 could also have a tapered diameter reduction.

Rod 62 is designed to be deformable and have a non-stick surface. In a preferred embodiment, rod 62 is formed from an elastomeric material such as rubber. However, it is recognized that rod 62 may be formed from a variety of other materials.

In one embodiment, fabric 64 is formed from woven fiberglass. As mentioned above, fiberglass is a preferred material used in repairing aircraft engine parts. However, it is recognized that other materials may be used. Fabric 64 may be impregnated with a resin; a particularly suitable resin for this application is epoxy. Other types of resins that could be used include polyesters, bismaleimides (BMIs), and polyimides.

FIG. 6 shows fabric 64 in the process of being wrapped as a coil around middle region 68 of rod 62. In embodiments, a minimum of two complete layers of fabric 64 may be wrapped around rod 62. Complete wraps are preferred so that the thickness of the fabric is uniform around rod 62.

FIG. 7 shows a top view of rod 62 and fabric 64 after fabric 64 has been wrapped around rod 62. In the embodiment shown in FIG. 7, three complete layers of fabric 64 (first ply P1, second ply P2 and third ply P3) are wrapped as a coil around rod 62.

In FIGS. 5-7, rod 62 is in a relaxed state. As stated above, rod 62 is designed to be deformable. Rod 62 can be pulled and elongated to a stretched state. In its stretched state, rod 62 has a length greater than length L1, and middle region 68 has a diameter less than diameter RD (in the relaxed state).

It is recognized that a rod, similar to rod 62, could be available with a fabric, similar to fabric 64, pre-wrapped on the rod, and as such, the steps shown in FIGS. 5 and 6 would not be necessary.

Figure 8:
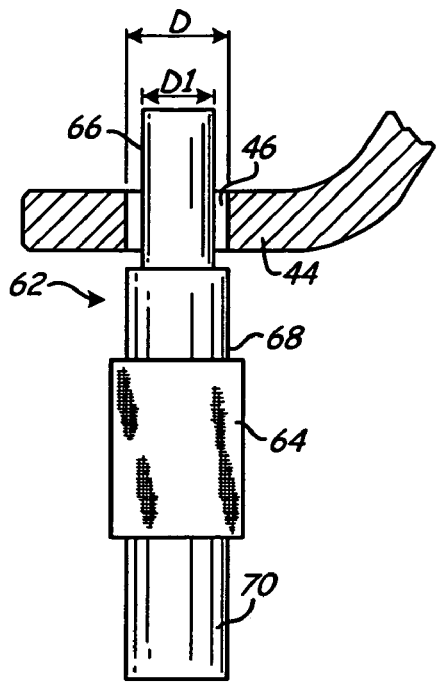
FIGS. 8-15 illustrate general steps for using the system shown in FIGS. 5-7 to repair an enlarged bolt hole on a nose cone.

FIGS. 8-15 show general steps for using system 60 to repair an enlarged bolt hole. FIG. 8 shows system 60 including rod 62 wrapped with fabric 64, and flange 44 (shown in section) including balance weight hole 46 and a portion of ramp 42, both on nose cone 12 as shown in FIG. 4. In FIG. 8, nose cone 12 has been rotated approximately 90 degrees clockwise relative to its position in FIG. 4.

In the description immediately below, system 60 is used in the context of repairing balance weight holes 46 on flange 44. System 60 could also be used for repairing attachment holes 48 on flange 44, or many other types of enlarged holes in various other components.

FIG. 8 shows first end region 66 of rod 62 being inserted through hole 46. Because first diameter D1 of first end region 66 is less than enlarged diameter D of hole 46, first end region 66 is easily able to pass through hole 46. Once first end region 66 is through hole 46, first end region 66 and second end region 70 may each be grasped and pulled to elongate rod 62 to the stretched state.

Figure 9:
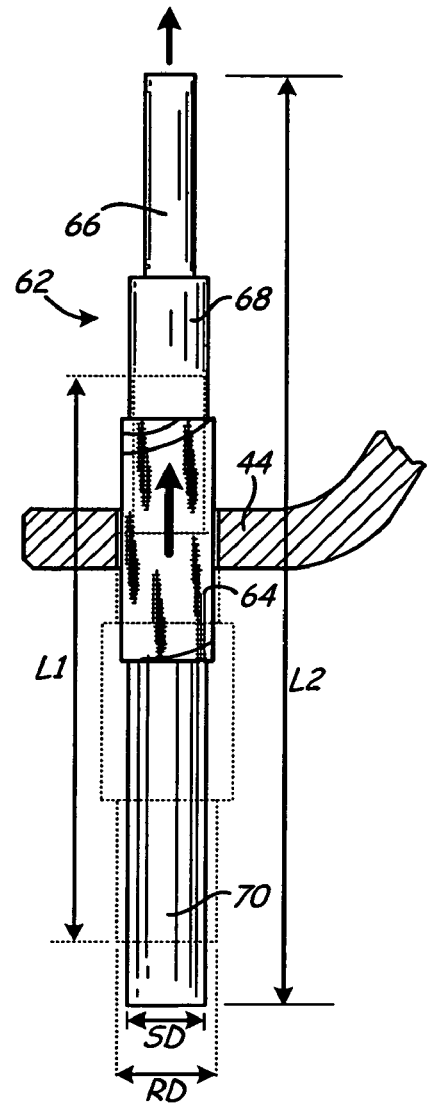

FIG. 9 shows rod 62 in the stretched state, as compared to its relaxed state as shown in FIG. 8. In the stretched state, rod 62 has second length L2 which is substantially greater than length L1 of the relaxed state, and middle region 68 of rod 62 has stretched diameter SD which is substantially less than diameter RD of the relaxed state.

As discussed above, in embodiments, fabric 64 maybe impregnated with a resin, like epoxy. Therefore, fabric 64 is sticky and adheres to rod 62 during the elongation process. When fabric 64 is initially wound around rod 62 in the relaxed state, fabric 64 is tightly wound such that the layers of the coil (first ply P1, second ply P2, third ply P3) are completely aligned with one another. When rod 62 is elongated, fabric 64 also stretches with rod 62 and fabric 64 becomes uncoiled somewhat on rod 62, as shown in FIG. 9.

Once rod 62 is in the stretched state, stretched diameter SD of middle region 68 is less than enlarged diameter D of hole 46, so the elongated rod 62 may be pulled through hole 46 until fabric 64 is aligned with hole 46. Because stretched diameter SD of middle region 68 is less than enlarged diameter D of hole 46, middle region 68 of rod 62, having fabric 64 wrapped around it, can easily pass through hole 46 without fabric 64 contacting an inside periphery of hole 46. As fabric 64 is sticky, it is preferred that fabric 64 does not contact the inside periphery of hole 46 during movement of rod 62 through hole 46. It is also preferred that wrinkles in fabric 64 are not formed during installation.

When fabric 64 is aligned with hole 46, excess fabric should extend at both ends beyond hole 46. The excess is due in part to the stretching of fabric 64 on rod 62 as explained above. Once fabric 64 is properly aligned, rod 62 may be returned to its relaxed state by releasing the pulling force on first end region 66 and second end region 70. As rod 62 relaxes, it returns to its original dimensions of length L1 and middle region 68 having diameter RD.

Figure 10:
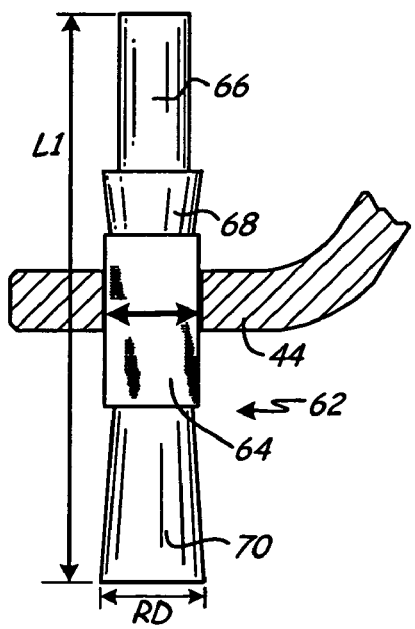

FIG. 10 shows rod 62 and fabric 64 after rod 62 is returned to its relaxed state. When middle region expands back to having diameter RD, fabric 64 is then compressed against the inside periphery of hole 46. Although not visible in FIG. 10, three layers of fabric 64 (first ply P1, second ply P2 and third ply P3) are compressed between the inside of hole 46 and rod 62.

Fabric 64 may then be cured at an elevated temperature so the resin impregnated in fabric 64 hardens and stabilizes fabric 64. As fabric 64 hardens, it adheres to the inside periphery of hole 46. As a result, fabric 64 becomes immobile and is secured inside hole 46.

As an alternative to an elevated curing process, a resin that cures at room temperature could also be used; however, this may require that the steps outlined above, and shown in FIGS. 8-10, be performed quickly before the resin in the fabric cures.

When rod 62 was elongated to its stretched state, fabric 64 stretched along with it and became distorted (see FIG. 9). When rod 62 compresses back to its relaxed state, fabric 64 essentially returns to its original coil-wrapped configuration, and the thickness of fabric 64 is substantially uniform at all points around middle region 68 of rod 62.

As shown in FIG. 10, excess fabric 64 preferably extends past upper surface 50 and inner surface 52 of flange 44. The excess fabric can be handled in a variety of ways, two of which are described below.

Figure 11:
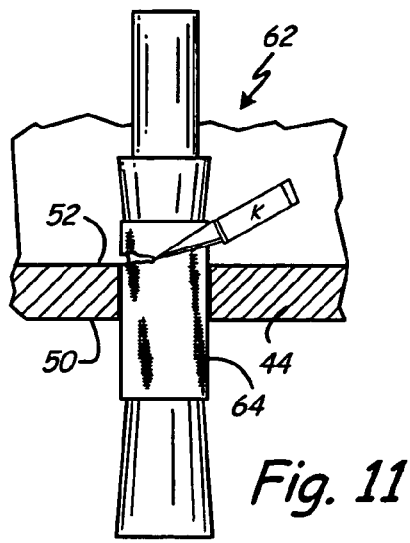

In FIGS. 11-12 and 14-15, flange 44 is rotated approximately 90 degrees clock-wise as compared to FIGS. 8-10. FIG. 11 shows excess fabric on inner surface 52 of flange 44 being trimmed off with knife K. Inner surface 52 of flange 44 may be used as a backing surface to cut through the layers of fabric 64.

Figure 12:
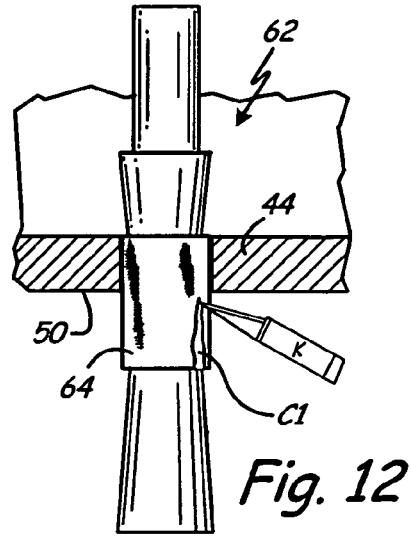
Figure 13:
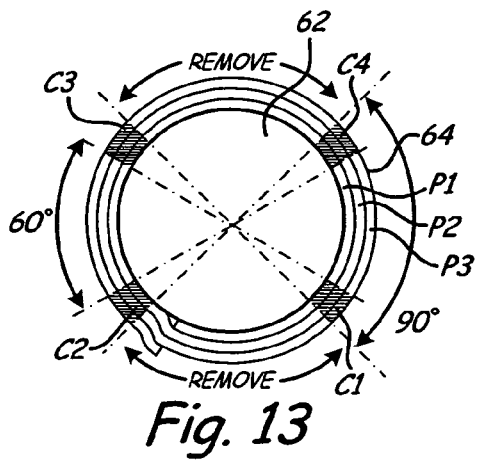
Figure 14:
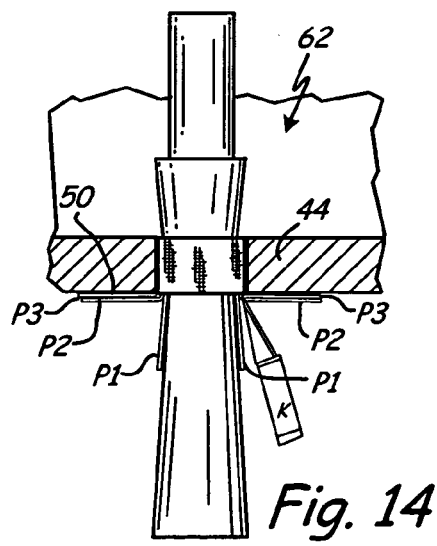

As an alternative to trimming off the excess fabric, the excess fabric could be used to form a bow tie, similar to a flanged bushing head, around an area surrounding the hole 46 on outer surface 50 or inner surface 52 of flange 44. FIGS. 12-14 illustrate general steps for forming a bow tie around outer surface 50 of flange 44. It should be noted than while a bow tie shape is described herein, any other suitable shape may also be utilized.

FIG. 12 shows a first step in forming the bow tie on outer surface 50 of flange 44. Knife K may be used to make first vertical cut C1 through fabric 64 using rod 62 as a cutting surface.

FIG. 13 is a bottom view of rod 62 and fabric 64, showing a second step in forming the bow tie. In addition to cut C1, second vertical cut C2, third vertical cut C3 and fourth vertical cut C4 may be similarly made through the layers of fabric 64. As shown in FIG. 13, fabric between cuts C1 and C2 may then be removed, and fabric between cuts C3 and C4 may be removed. The two remaining bow tie portions of fabric (first portion between cuts C1 and C4; second portion between cuts C2 and C3) may then be used to form the bow tie.

In embodiments, the angle between cuts C1 and C4 (and similarly between cuts C2 and C3) may be less than 120 degrees. A preferred range for the angle between cuts C1 and C4 (and between cuts C2 and C3) is between 60 and 90 degrees; and as shown in FIG. 13, cuts C1-C4 may be made anywhere in the shaded region depending on the desired angle.

FIG. 14 shows a third step in forming the exemplary bow tie on outer surface 50. After fabric 64 is formed into two bow tie portions, outer ply layers P2 and P3 may be folded down on each side of hole 46 on outer surface 50 and trimmed off using knife K and outer surface 50 as a backing surface. Plies P2 and P3 can be cut through separately or as a single cut (as shown in FIG. 14). After plies P2 and P3 have been trimmed off and removed, the only excess fabric remaining is the two halves of first ply P1, which may then be folded down flush with outer surface 50 of flange 44, forming the bow tie.

Figure 15:
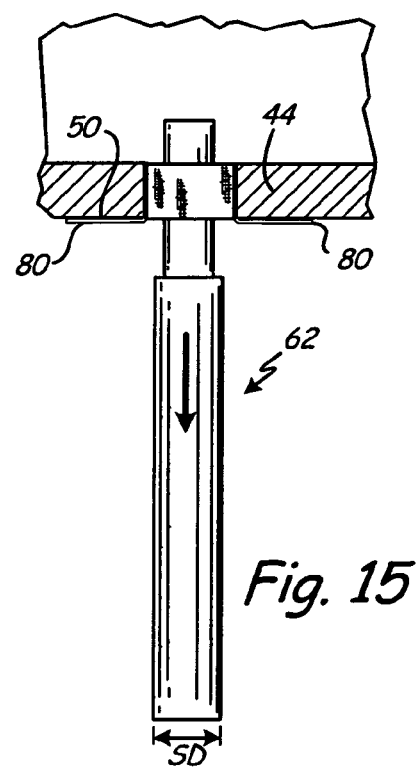

FIG. 15 shows exemplary bow tie 80 (formed from first ply P1) in position on outer surface 50 of flange 44. A benefit of bow tie 80 is that the three layers of fabric 46 compressed against the inside periphery of hole 46 are positively retained within hole 46, similar to a flange bushing. Bow tie 80 may also protect the layers of fabric 64 within hole 46 from peeling back or being damaged by a bolt secured within hole 46.

As described above with reference to FIGS. 11-15, the excess fabric extending beyond inner surface 52 of flange 44 was trimmed off, and the excess fabric extending beyond outer surface 50 of flange 44 was used to make bow tie 80. However, it is recognized that a second bow tie could similarly be formed on inner surface 52 of flange 44. In an alternative embodiment without a bow tie, the excess fabric could be trimmed off on both sides of flange 44.

In the embodiment described above and shown in FIGS. 8-15, fabric 64 formed a coil around rod 62 having three layers (first ply P1, second ply P2, third ply P3). However, in other embodiments, a coil of fabric 64 could have one layer, two layers, or more than three layers. To form a bow tie similar to bow tie 80 of FIG. 15, regardless of how many layers of ply are present, all of the layers except for the innermost layer may be cut and removed (as shown in FIG. 14). Then the two bow tie portions of the innermost layer may be folded down to form a one-layer bow tie. In other embodiments, a multi-layer bow tie may be similarly formed, if desired.

Bow tie 80 could also be formed using an alternative method. Instead of making vertical cuts through all three layers of fabric 64 (as shown in FIGS. 12 and 13), the outer wrap could be uncoiled (starting with third ply P3) until the innermost layer of fabric is revealed (first ply P1). Knife K can be used to trim off the fabric already uncoiled. First ply P1 remains intact on rod 62. The steps outlined above in reference to FIG. 13 (making four cuts and removing fabric between two cuts) may then be performed for first ply P1, forming two bow tie portions that may then be peeled back to form the one-layer bow tie.

FIG. 15 shows rod 62 as it is being removed from repaired hole 46. Because fabric 64 has been cured and hardened, rod 62 is releasable from contact with fabric 64. Rod 62 is re-elongated to return to the stretched state in which middle region 68 has stretched diameter SD. In the stretched state, rod 62 can be easily removed through hole 46.

In a preferred embodiment, rod 62 is formed from inexpensive rubber, and rod 62 is disposable after being removed from hole 46. Alternatively, rod 62 could be re-used to have a new fabric coil wrapped around its middle portion, for repairing another enlarged hole.

Figure 16:
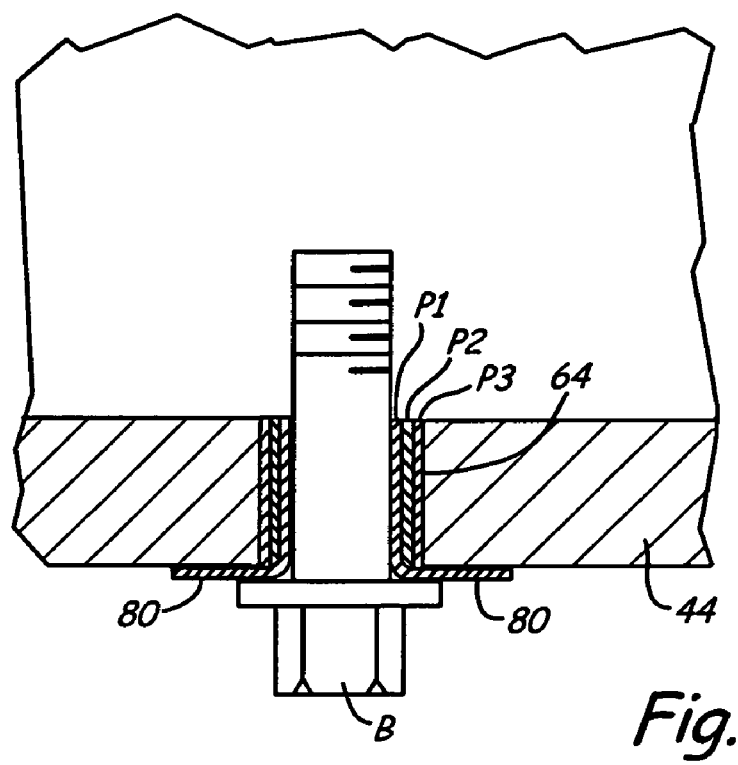
FIG. 16 is a cross-sectional view of the portion of the nose cone of FIG. 4 with the repaired hole and a bolt secured within the repaired hole.
Figure 17:
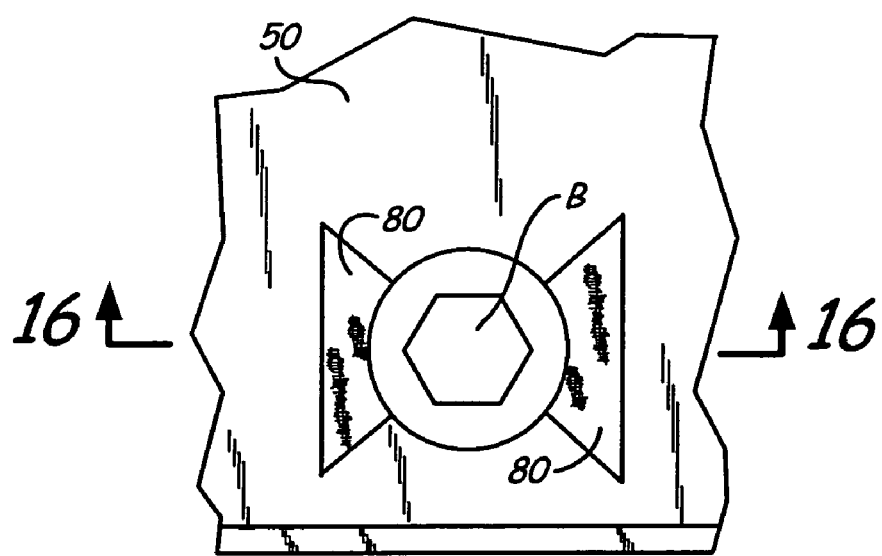
FIG. 17 is a top view of the portion of the nose cone of FIG. 16 rotated 90 degrees.

FIGS. 16 and 17 show flange 44 with repaired balance weight hole 46 having fabric 64 installed as a bushing and bolt B secured within hole 46. FIG. 16 is a cross-sectional view of flange 44 and hole 46 with fabric 64, including bow tie 80 described above. FIG. 16 shows first ply P1, second ply P2 and third ply P3 of fabric 64. As shown in FIG. 16, bow tie 80 is formed from first ply P1.

FIG. 17 is a top view of outer surface 50 of flange 44, bow tie 80 and bolt B. As shown in FIGS. 16 and 17, in a preferred embodiment, bow tie 80 is formed such that a major axis of bow tie 80 is circumferential to an axis of an engine (see FIG. 1) and bow tie 80 is parallel to an edge of flange 44. However, it is recognized that in other embodiments, a bow tie could be formed such that it is oriented perpendicular to the edge of flange 44. Thus, the bow tie would be rotated 90 degrees on outer surface 50, as compared to bow tie 80 of FIGS. 16 and 17.

As discussed earlier, fabric 64 is formed from woven fiberglass in a preferred embodiment. Different weave styles and yarn sizes exist for all woven fabrics. For this type of application, the thickness of the fabric typically may vary between weave styles from approximately 0.002" to 0.030" per ply, although any suitable thickness may be used. An example of a representative specification for woven fiberglass is SAE AMS 3824.

Prior to performing the steps outlined above with reference to FIGS. 5-7 and 8-15, the diameter of the damaged hole may be measured to determine the appropriate thickness of the fabric, as well as the number of layers of ply to be installed into the hole. The present invention also includes rods having a range of diameters to accommodate varying dimensions of the damaged holes.

The present invention relates to a method and system for repairing an enlarged bolt hole on a nose cone of a gas turbine engine; however, it is recognized that this method and system could be used for the repair of any type of enlarged or damaged hole, particularly bolt holes.

Although the present invention has been described with reference to preferred embodiments, workers skilled in the art will recognize that changes may be made in form and detail without departing from the spirit and scope of the invention.

The invention claimed is:

1. A method of repairing a damaged hole, the method comprising:
   inserting a first portion of a deformable rod into the hole, wherein the rod has a woven fabric wrapped around a middle portion of the rod;
   stretching the rod to align the middle portion of the rod and the fabric with an inside circumference of the hole; and
   relaxing the rod to compress the fabric against the inside circumference of the hole;
   stretching the rod to release the rod from contact with the fabric; and
   removing the rod from the hole.

2. The method of claim 1 and further comprising:
   curing the fabric such that resin impregnated in the fabric hardens, thereby adhering the fabric to the inside circumference of the hole and stabilizing the fabric inside the hole.

3. The method of claim 1 and further comprising:
   removing at least one outer layer of a portion of the fabric that extends beyond the hole;
   removing at least portions of an inner layer of the portion of the fabric extending beyond the hole to form two bow tie portions therewith; and
   securing each bow tie portion to a region surrounding the hole.

4. The method of claim 1, wherein the woven fabric is fiberglass.

5. The method of claim 1, wherein the woven fabric is impregnated with a resin.

6. The method of claim 5, wherein the resin is epoxy.

7. The method of claim 1, wherein the rod is made from an elastomer.

8. The method of claim 7, wherein the elastomer is rubber.

9. A method of repairing an enlarged hole having a diameter, the method comprising:
   wrapping a woven, impregnated fabric around an elastomeric rod, the rod having a first end region, a second end region and a body region, wherein the first end region has a diameter that is less than a diameter of the body region, and the fabric is wrapped around the body region;
   inserting the first end region of the rod through the enlarged hole;
   stretching the rod to elongate the rod and reduce the diameter of the body region such that the diameter of the body region of the rod is less than the diameter of the enlarged hole;
   positioning the elongated rod within the enlarged hole such that the fabric wrapped on the rod is positioned inside the enlarged hole; and
   relaxing the rod to compress the fabric against an inside circumference of the enlarged hole;
   stretching the rod to re-elongate the rod and reduce the diameter of the body region;
   releasing the rod from contact with the fabric; and
   removing the rod from the hole.

10. The method of claim 9 and further comprising:
    curing the fabric such that resin impregnated in the fabric hardens, thereby adhering the fabric to the inside circumference of the hole and stabilizing the fabric inside the hole.

11. The method of claim 9, wherein at least two complete layers of the woven fabric are wrapped around the rod.

12. The method of claim 9, wherein the enlarged hole is one of a plurality of holes formed on a nose cone of a gas turbine engine.

13. A kit for repairing an enlarged hole, the kit comprising:
    an elastomeric rod that is originally in a relaxed state having a relaxed diameter, the rod being capable of being elongated to a stretched state having a stretched diameter that is less than the relaxed diameter to be insertable into and removable from the hole; and
    an impregnated fabric wrapped around the rod, wherein the fabric is insertable into an inside periphery of the hole when the rod is in the stretched state, and the fabric is engageable with the inside periphery of the hole when the rod is returned to the relaxed state.

14. The kit of claim 13 further comprising a curing device for curing the fabric once the fabric is engaged with the inside periphery of the hole such that an impregnated resin in the fabric hardens and causes the fabric to adhere to the inside periphery of the hole.

15. The kit of claim 13, wherein the fabric wraps around the rod at least once.

16. The kit of claim 13, wherein the rod comprises:
    a first end portion having a diameter;
    a second end portion; and
    a body portion having a diameter and disposed between the first end portion and the second end potion, wherein the diameter of the first end portion is less than the diameter of the body portion when the rod is in the relaxed state.

17. The kit of claim 16, wherein the second end portion has a diameter that is substantially equal to the diameter of the first end portion.

18. The kit of claim 13 further comprising a cutting device for cutting through a portion of the fabric extending beyond the inside periphery of the hole, such that a portion of the fabric can be spread down on a region surrounding the hole to retain the fabric against the inside periphery of the hole.

* * * * *